Aug. 17, 1937.  H. G. MARTIN  2,090,391
METHOD OF AND APPARATUS FOR EXAMINING EYES
Filed June 5, 1936   3 Sheets-Sheet 1
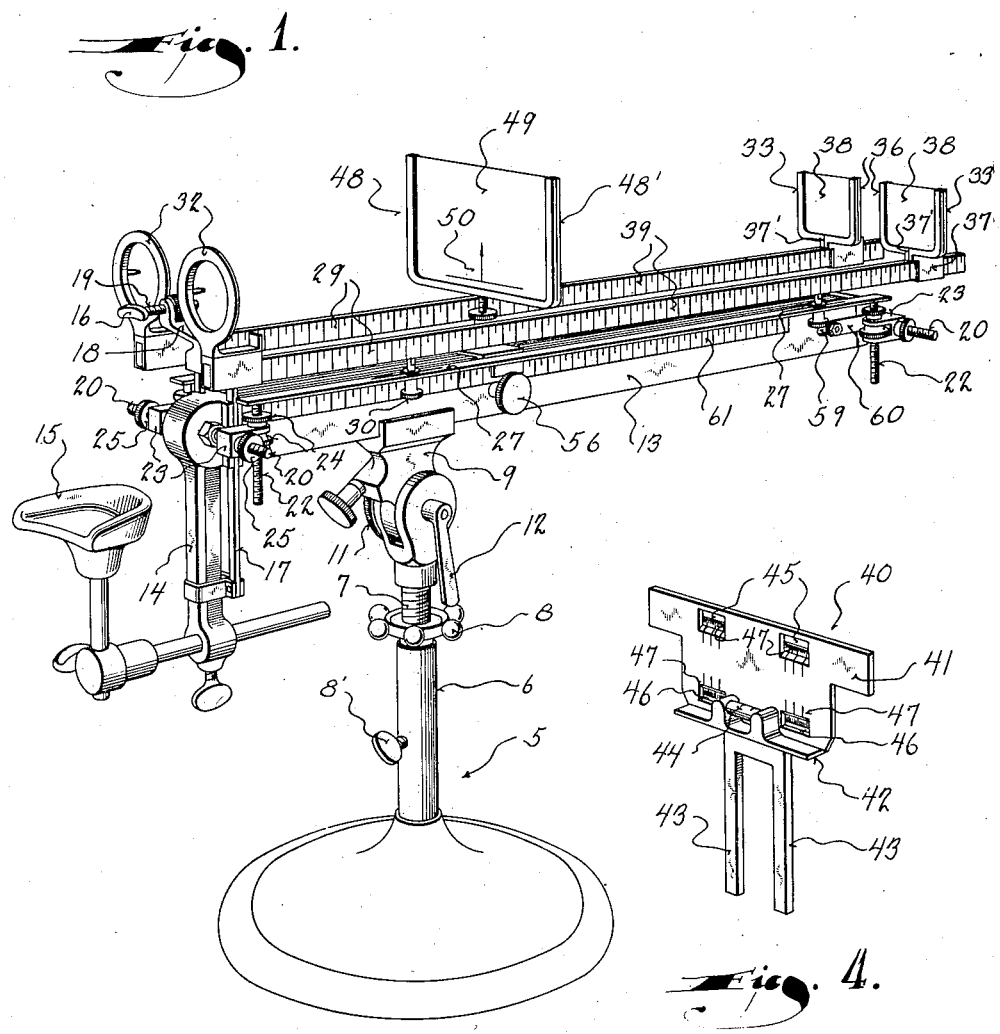

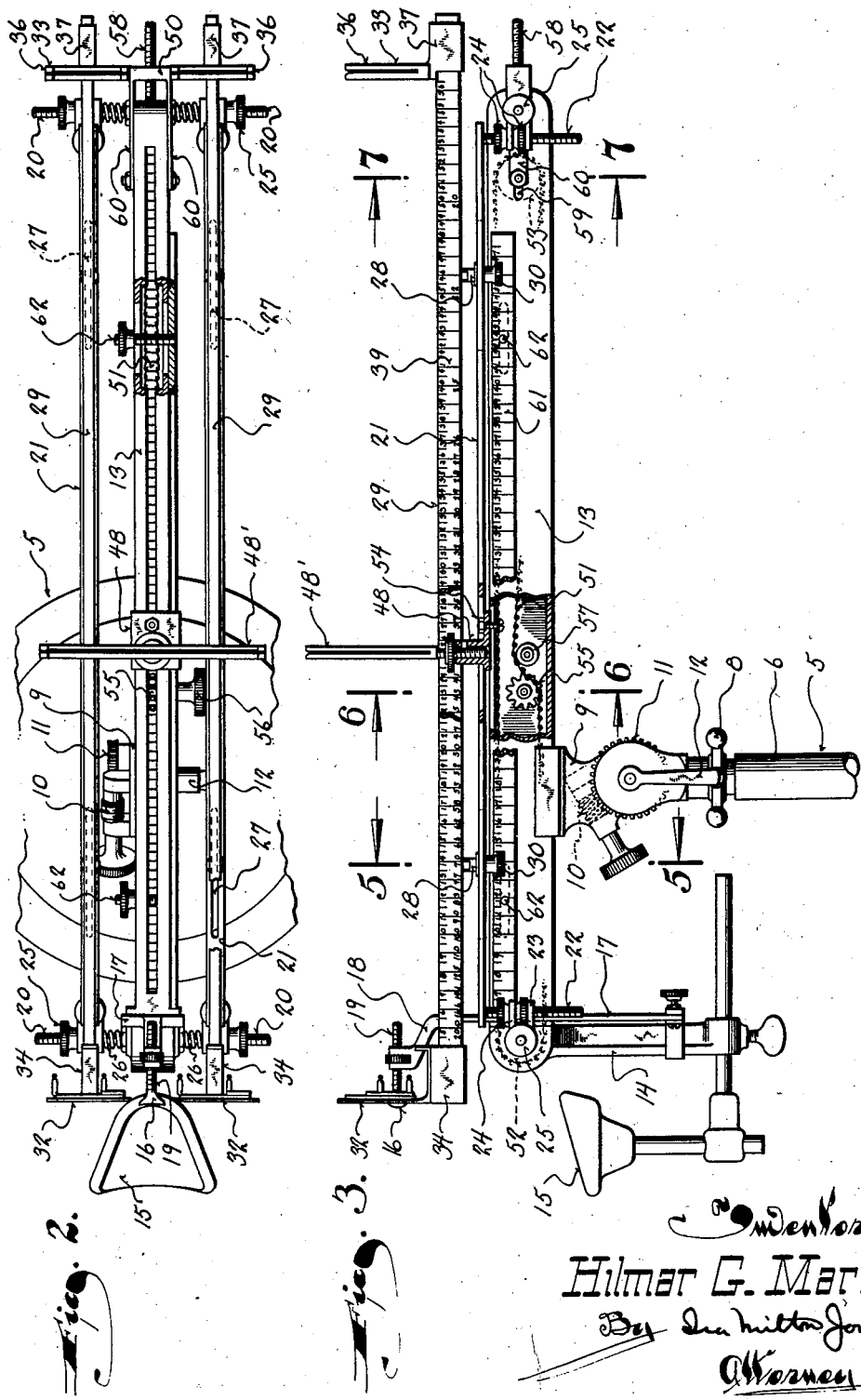

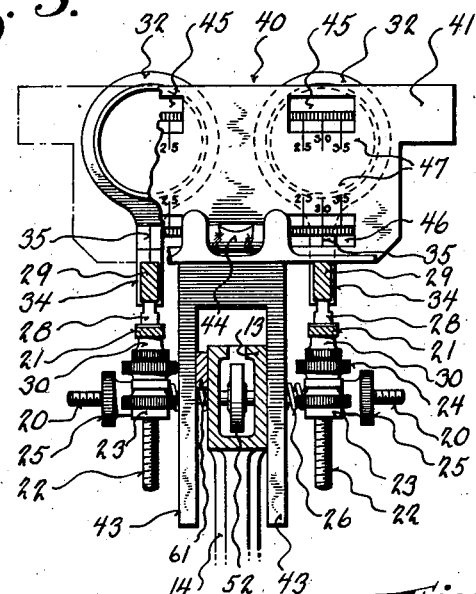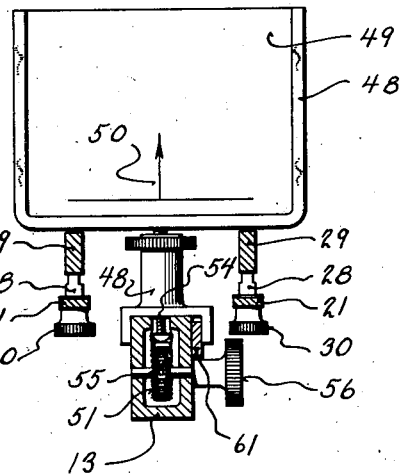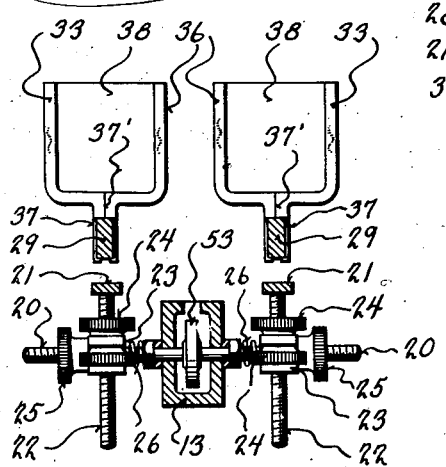

Patented Aug. 17, 1937

2,090,391

UNITED STATES PATENT OFFICE 2,090,391

METHOD OF AND APPARATUS FOR EXAMINING EYES

Hilmar G. Martin, Milwaukee, Wis., assignor to The Medical Society of Milwaukee County, Milwaukee, Wis., a corporation of Wisconsin Application June 5, 1936, Serial No. 83,672

14 Claims. (Cl. 88—20)

This invention relates to a method of and an apparatus for examining eyes and refers particularly to the testing of accommodative and convergent functions to enable proper correction for different types of ametropia (errors of refraction).

In the methods of testing eyes heretofore in use, accommodative and convergent functions were never accurately determined, but only approximated, especially for any given near work distance. Inasmuch as accommodation and convergence are at all times related in use, accommodative and convergent functions must be determined and expressed in units which are comparable and bear a definite relationship to each other if the determinations of the tests are to be of any value.

This invention thus seeks as one of its objects to provide a method of testing the functions of convergence and accommodation and expressing the measurement thus obtained respectively in meter angles and diopters which bear a definite relationship to each other and permit useful comparison.

Another object of this invention is to provide a more accurate method of testing accommodation. All known past methods of testing relative accommodation consisted merely in determining the strongest lens the eye could overcome which involved changing lenses in a test frame, i. e., inserting one, removing it, inserting another, and so on. The process of accommodative exertion or relaxation was constantly interrupted and as a result the full latent power was not brought out. To overcome this deficiency of past methods, this invention contemplates one continuous uninterrupted application of measurement so that the accommodative effort is constantly and uninterruptedly applied.

Another important object of this invention is to provide a method of testing the muscles of accommodation and convergence in such a manner that when one function is being determined, all other normally associated functions are maintained at a known or constant and measurable state.

Another object of this invention is to provide a method and means for determining both the monocular near point of accommodation and the binocular near point of accommodation with the determination of each expressed in diopters so as to enable comparison of the two.

With the above and other objects in view which will appear as the description proceeds, this invention resides in the novel method and apparatus substantially as hereinafter described and more particularly defined by the appended claims, it being understood that such changes in the precise embodiment of the herein disclosed invention may be made as come within the scope of the claims.

The accompanying drawings illustrate one complete example of the apparatus of the invention constructed according to the best mode so far devised for the practical application of the principles thereof, and in which:

Figure 1 is a perspective view of an apparatus or instrument constructed in accordance with this invention;

Figure 2 is a top plan view thereof;

Figure 3 is a side elevation, with parts broken away and in section;

Figure 4 is a perspective view of the leveling device used in adjusting the instrument;

Figure 5 is a cross sectional view through Figure 3 on the plane of the line 5—5, showing the manner of using the leveling device for transverse leveling and interpupillary measurement;

Figure 6 is a cross sectional view through Figure 3 on the plane of the line 6—6; and Figure 7 is a cross sectional view through Figure 3 on the plane of the line 7—7.

Referring now particularly to the accompanying drawings in which like numerals indicate like parts throughout the several views, the numeral 5 designates the base upon which the entire instrument rests and which includes an upright pedestal 6 having a threaded stem 7 slidably received therein. The stem is adjustable vertically in the pedestal 6 by means of a nut 8 and may be locked in adjusted position by a wing nut 8' to locate the instrument at a desired elevation.

The upper end of the threaded stem 7 pivotally mounts a supporting head 9, the angular position of which is adjustable by means of a worm 10 carried by the head 9 and engaging a stationary worm wheel 11. A clamping handle 12 threaded on the stud about which the head is pivoted provides means for locking the head in any angular position of adjustment.

Secured to the supporting head 9 is a beam 13, channel-shaped in cross section with the opening uppermost. Fixed to the forward end of the beam is a depending bracket 14 on which a chin rest 15 is adjustably mounted. The bracket 14 also mounts a nose piece 16 through a vertically adjustable forked member 17 having a forwardly directed arm 18 at its upper end in which a threaded stud 19 carrying the nose piece is adjustably mounted. In this manner, the nose piece is adjustable both horizontally and vertically as is also the chin rest so that the instrument and specifically the supporting beam may be comfortably adjusted to any patient.

At its opposite ends the beam has laterally projecting threaded studs 20 rigidly secured thereto upon which two spaced supporting bars 21 are adjustably mounted. The bars 21 are attached to the threaded studs 20 through the medium of vertical screws 22 fixed to the opposite ends of the bars and passed through the arms of bifurcated carriers 23 which are slidable on the studs 20. Thumb screws 24 threaded on the screws 22 serve to hold the screws 22, and consequently the adjacent ends of the bars 21 in selected positions of vertical adjustment.

Lateral adjustment of the bars 21 is effected by means of thumb screws 25 threaded on the studs 20 and bearing against the outer faces of the carriers 23 which are yieldingly urged outwardly against the thumb screws 25 by springs 26.

The bars 21 have longitudinal slots 27 near their opposite ends to receive posts 28 by which members or rails 29 are longitudinally adjustably mounted from the bars 21. The posts 28 have lower threaded portions which project through the elongated slots 27 and have clamping screws 30 threaded thereon by which the posts are secured in adjusted position. By virtue of the longitudinal adjustability of the members or rails 29 and the vertical and laterally horizontal adjustability of the supporting bars 21, it is possible to locate the members or rails 29 in accordance with any interpupillary distance and in proper alignment with the direct vision of any patient and to also locate the forward ends of the members or rails 29 at a definite distance with respect to the anterior surface of the cornea of the eyes. The rails 29 provide tracks upon which lens holders 32 and card carriers 33 may slide. The lens holders are arranged to take the conventional testing lenses and have rectangular sleeves 34 to slidably embrace the rails. The front ends of these sleeves are in line with the plane of a lens in position and the opposite ends of the sleeves have upstanding lugs bearing vertical scratch marks 35 in vertical planar alignment with the centers of the lenses in position.

The card carriers 33 consist of U-shaped frames 36 mounted on rectangular sleeves 37 which slidably embrace the rails 29. The forward ends of these sleeves are in line with the cards 38 held by the carriers so that the position of the cards with respect to scales 39 delineated on the rails 29 may be easily determined. It is for the same purpose that one end of the sleeves 34 of the lens holders align with the planes of the lenses in position therein. The front faces of the carriers have vertical scratch marks 37' indicating the median plane of their respective cards.

The scales 39 are graduated in centimeters along the top row and in diopters along the bottom row.

To facilitate the measurement of the interpupillary distance and to permit the rails 29 to be adjusted to exact parallelism a combined leveling and measuring device, indicated generally by the numeral 40 is provided. This device, as best shown in Figure 4, consists of a plate 41 having a flat base 42 from which two vertical parallel spaced legs 43 depend. The base 42 carries a spirit level 44 to indicate when the device is horizontal.

The plate 41 has upper and lower pairs of sight openings 45 and 46, respectively, spaced apart a distance corresponding to the interpupillary distance of the average individual, but with the openings long enough to accommodate a wide range of interpupillary distances.

As best illustrated in Figure 5, scales 47 delineated in millimeters and representing the distance from the center of the device are delineated at each opening.

In using the combined leveling and measuring device 40 to measure interpupillary distance, its legs 43 straddle the beam and its base rests on top of the rails 29, as shown in Figure 5.

It is to be observed that the legs 43 fit the beam closely so that the device is firmly held against shifting laterally. Consequently the interpupillary distance may be split up into its two components, viz. the distances from the center of the nose to the centers of the two eyes and each may be measured separately.

To determine whether or not the rails are longitudinally level, the leveling and measuring device is rested on the top of the rails with its base in longitudinal alignment therewith.

Slidable on the beam is another card carrier 48 in which a larger card 49 is received. This card has an arrow or other central designation 50 on one face which is used in measuring convergence, and on its reverse side it has test type which is used in determining binocular accommodation. The carrier 48 consists of a part arranged to slide along the top of the beam 13, and a U-shaped frame 48' adjustably mounted thereon and in which the card is received. The carrier is slid along the beam by any suitable mechanism, in the present instance by an endless chain 51. The chain 51 is trained about idler pulleys 52 and 53 at the opposite ends of the beam and has the carrier attached thereto, as at 54. A drive pinion 55 meshing with the chain and provided with a thumb screw 56 serves to move the chain back and forth, and to hold the chain in proper mesh with the pinion, a third idler pulley 57 is provided.

The chain may be drawn taut by an adjusting screw 58 which draws the idler pulley 53 toward the adjacent end of the beam, the shaft for the pulley 53 passing through elongated slots 59 in the sides of the channel-shaped beam and having its ends attached to the arms of a U-shaped strap 60 in the head of which the screw 58 is threaded.

Longitudinally adjustably secured to one side of the beam is a scale 61 delineated in centimeters and used to read off the distance of the card 49 from the cornea of the eyes. The scale 61 is held in any desired position of longitudinal adjustment by screws 62, the purpose of its adjustment being to permit the same to be properly disposed with respect to the cornea of the patient's eyes.

*Method of examination and operation of instrument*

In adjusting the instrument to the patient, the patient is seated before the instrument with his chin in the chin rest 15 which is adjusted either up or down, forward or backward, as required, and then the nose piece 16 is properly adjusted to engage the bridge of the nose whereupon the beam or back bone of the instrument and the patient's eyes are held in definite fixed relationship. The rails 29 bearing the scales 39 are then adjusted longitudinally so that their inner ends are at a specified distance from the anterior surface of the cornea. In the present instance, this distance is 1 centimeter as the scales 39 start with 1 rather than 0.

The scale 61, which is used in determining convergence, is then also adjusted longitudinally into correspondence with the scales 39.

Adjustment of the rails 29 into alignment with the pupils of the eyes is then effected in the following manner.

The lens holders 32 are applied to the forward ends of the rails and in each one a plain glass lens is inserted. These clear glass lenses have vertical and horizontal scratch marks intersecting at the exact center of the lenses. The examiner then sights from the far end of the rails 29 at each eye separately and adjusts each rail vertically and laterally by means of the screws 24 and 25 so as to locate the center of each lens exactly in line with the center of the pupil of its respective eye.

With the rails 29 adjusted in this manner, the leveling and measuring device 40 is rested on the rails directly adjacent the outer ends of the lens holders.

With the device 40 in position, the interpupillary distance may be read off in millimeters on its lower scales 47, as clearly shown in Figure 5, or if desired, the interpupillary distance may be read directly on the upper scales by sighting through the adjacent upper openings 45 to the vertical scratch marks on the lenses.

The device 40 is then positioned at the opposite end of the instrument, again resting on the rails 29 and by sighting through its lower openings 46 and using the lower scales 47 and the scratch marks 37' on the card carriers 33, these ends of the rails may be adjusted to the same spacing as the forward ends.

Inasmuch as one of the patient's eyes may be on a higher level than the other, the rails are individually vertically adjustable to enable each rail to be separately adjusted in correspondence with the line of vision of its respective eye. In effecting this adjustment the device 40 is used to longitudinally level each rail individually, thus insuring exact parallelism as the spacing between the rails has already been set to equidistance throughout their length.

The instrument is now set up ready for use.

*Accommodation tests*

In testing accommodation, each eye is tested separately, an opaque disc being inserted in the lens holder 32 in front of the eye not being tested.

*Maximum accommodation*

To test maximum accommodation the patient is instructed to fix the gaze of his eye being tested upon the finest test type or print on the respective test card which is placed well out on the rail 29 at 30 centimeters or more. The examiner then slides the card carrier slowly and uniformly toward the eye being tested along the rail 29, stopping the advance of the card at the point at which the patient indicates the fine print blurs or becomes illegible. The location of the card is then read off on the scale 39, using the forward edge of the sleeve of the card carrier as an indicator. The upper markings of the scale 39, as hereinbefore noted, are delineated in centimeters, while the lower graduations represent diopters. This reading is recorded in diopters and represents the maximum accommodation for the eye tested. The other eye is then tested in like manner.

With the maximum accommodation determined for each eye, a comparison of these readings may be made with any accepted scale of accommodation for the normal or emmetropic eye. While there are variations in the different scales used for this purpose, the one most generally accepted is partially as follows:

| Age | 8 | 9 | 10 | 11 | 12 | 13 | 14 | 15 |
|---|---|---|---|---|---|---|---|---|
| Diopters | 13.8 | 13.6 | 13.4 | 13.3 | 13.1 | 12.9 | 12.7 | 12.6 |

If the dioptric measurement of maximum accommodation arrived at in the manner described is compared with this scale, it is at once apparent whether the patient has normal accommodation or whether he is nearsighted or farsighted.

Assuming that the patient is fifteen years old and the near point of accommodation determined by this test is 10 diopters, by referring to the scale it is seen that this patient is hyperopic for at this age he should have a normal maximum accommodation of 12.6 diopters. Consequently, the patient is hyperopic to the extent of 2.6 diopters, which means that to bring his eyes to normal as far as accommodation is concerned, requires a lens of 2.6 diopters strength.

*Range and region of accommodation*

To determine the range and region of accommodation, the card carrier 33 is placed at the extreme end of the rail 29 and then moved slowly toward the eye until the fine print on the card is just legible. This point is read off on the scale 39 in diopters, and noted.

The card carrier is then continued in its movement toward the eye until the point of maximum accommodation is reached. This is when the clear vision of the fine print ceases. The reading in diopters at this location of the card is again taken on scale 39 and the difference between the two readings shows the range and region of accommodation. In presbyopia and high degrees of hyperopia this determination of the range and region of accommodation is especially important, as it enables the examiner to prescribe the lens which permits the greatest range of accommodation. This test also serves to guard against overcorrection of presbyopes.

All of these tests are first made without correcting lenses to establish the patient's natural functions of accommodation and then with the tentative or determined correcting lenses in place to determine their effects on the same functions.

*Amplitude of accommodation*

Having determined the maximum accommodation and knowing the amount of accommodation in use for distant vision, if any, as in hyperopes, the amplitude of accommodation is apparent. For the emmetropic eye, the amplitude of accommodation is represented by the reading of the near point or maximum accommodation, whereas in hyperopes, to determine the amplitude, the amount of accommodation required for distant vision must be subtracted from the figure representing the near point of accommodation.

*Negative and relative accommodation*

In determining negative relative accommodation each eye is tested separately as previously.

The card carrier 33 is placed at the distance at which the test is to be made, determined in centimeters on the scale 39. This distance represents the near work distance of the patient. A known plus lens sufficiently strong to decidedly blur the fine print on the test card is then inserted in the lens holder 32 just before the eye to be tested.

The patient is instructed to fix his gaze upon the fine print which is blurred and illegible. The examiner then moves the lens holder 32 away from the eye directing the patient to indicate when the fine print becomes legible, at which point the motion of the lens holder is halted and the dioptric reading on the scale 39 is noted, using the front edge of the sleeve of the holder 32 as an indicator.

The dioptric lens strength of the known plus lens in the holder is then subtracted from this reading and the remainder expressed in diopters represents the amount of accommodative relaxation possible at this distance.

It is necessary however, to consider and correct for the amount of accommodation normally in use at the given near work distance, which is read off on the scale 39 in diopters at the point the card carrier is located. This reading is subtracted from the remainder just determined and the result represents the negative relative accommodation at this specified near work distance.

Positive relative accommodation

To determine the positive relative accommodation, a minus lens of sufficient strength to blur the fine print is inserted in the holder 32 in place of the plus lens and then with the card carrier in the same place, the lens is moved away from the eye toward the card and halted at the point where the fine print becomes legible. The dioptric reading of the then location of the lens is taken and the dioptric lens strength of the minus lens in use is subtracted from this reading. The remainder expressed in diopters is the amount of greatest accommodative exertion possible at this near work distance.

Correction is again made for the amount of accommodation normally required at this same distance by adding the figure in diopters representing the location of the card to the remainder just determined and the sum represents the positive relative accommodation for the specified distance.

Example

Suppose the relative accommodation is to be determined for a near work distance of 33 centimeters. The card carrier 33 is placed at 33 centimeters on the scale 39. Then, to test negative relative accommodation, place a 5 diopter sphere in the lens holder 32 and slide the carrier away from the eye to the point where the fine print just becomes readable.

Suppose this occurs at 11 centimeters on the scale 39 which is the same as 9 diopters, subtract the strength of the lens or 5 diopters from 9 diopters, which leaves 4 diopters. This figure represents the greatest amount of accommodative relaxation for the 33 centimeter distances. However, the normal accommodation in use at this distance of 33 centimeters is 3 diopters, as determined by the reading on scale 39 in line with the card carrier. Then subtracting this reading of 3 diopters from the 4 diopter figure just determined, leaves 1 diopter which represents the negative relative accommodation.

The positive relative accommodation is determined in like manner, but with the use of a minus lens instead of a plus lens. With a minus 5 diopter lens in place, the holder is slid away from the eye to the point where the print becomes legible. Suppose that this occurs at 15 centimeters on the scale which represents 6.6 diopters, subtracting the dioptric strength of the test lens, or 5 diopters, from this reading of 6.6 diopters, leaves 1.6 diopters, which represents the greatest amount of accommodative exertion of the eye at 33 centimeters.

However, the normal amount of accommodation in use at 33 centimeters is 3 diopters, which figure must be added to 1.6 diopters. The sum, 4.6 diopters, represents the positive relative accommodation.

In this example, the negative relative accommodation is 1 diopter and the positive relative accommodation is 4.6 diopters. The amplitude of accommodation for the eye tested at 33 centimeter distance is then apparent.

Reserve accommodation

The reserve accommodation in a given case at a determined near work distance is easily determined by merely comparing the dioptric reading representing the work distance with the determined amount of maximum accommodation of which the patient is capable. For instance, the amount of accommodation required at 33 centimeters is 3 diopters and if the amount of maximum accommodation of which the patient is capable is determined as 5 diopters, the reserve accommodation is but 2 diopters. As the amount of accommodation in constant use approaches too closely the maximum amount of accommodation of which the patient is capable so that there is but a limited reserve, symptoms of discomfort will be present.

Convergence

In testing convergence, the patient's position is maintained as described hereinbefore, but both eyes are now tested simultaneously. In this test the larger card 49 is used which is now mounted in its carrier with the arrow 50 facing the patient. The scale 61 having been previously adjusted to correspond with the scale 39, the instrument is ready for testing convergence.

Maximum convergence

To determine maximum convergence the card with the arrow 50 facing the patient is moved well out on the beam by means of the thumb screw, 56. The patient is instructed to fix his gaze upon the arrow and then the carrier is moved slowly toward the eyes until the arrow on the test card appears double. The distance of the card at this point from the patient's eyes is read off on the scale 39 in centimeters.

However, the reading in centimeters is not comparable to the readings of accommodation in diopters and of itself does not express a true measurement of the near point of convergence which also takes into account the interpupillary distance. Hence, the reading determined in centimeters is converted into meter angles which may be done mathematically, but preferably by consulting a chart which is partially as follows:

*Distance in cm.*

| Pd. in mm. | 5.0 | 5.5 | 6.0 | 6.5 | 7.0 | 7.5 | 8.0 | 8.5 |
|---|---|---|---|---|---|---|---|---|
| 56 | 16. | 14.72 | 13.45 | 12.7 | 11.9 | 11.1 | 10.5 | 9.9 |
| 57 | 16.2 | 14.9 | 13.8 | 12.9 | 12.09 | 11.3 | 10.7 | 10. |
| 58 | 16.4 | 15.1 | 14. | 13.1 | 12.2 | 11.5 | 10.8 | 10.1 |
| 59 | 16.6 | 15.36 | 14.2 | 13.3 | 12.4 | 11.72 | 11. | 10.3 |
| 60 | 16.9 | 15.6 | 14.5 | 13.5 | 12.6 | 11.9 | 11.2 | 10.6 |
| 61 | 17.1 | 15.8 | 14.72 | 13.7 | 12.8 | 12.09 | 11.3 | 10.8 |
| 62 | 17.3 | 16. | 14.9 | 13.9 | 13. | 12.2 | 11.5 | 10.9 |
| 63 | 17.5 | 16.3 | 15. | 14.1 | 13.2 | 12.45 | 11.7 | 11. |
| 64 | 17.8 | 16.45 | 15.2 | 14.2 | 13.4 | 12.63 | 11.9 | 11.1 |
| 65 | 18. | 16.7 | 15.5 | 14.4 | 13.6 | 12.81 | 12.1 | 11.3 |
| 66 | 18.2 | 16.9 | 15.7 | 14.6 | 13.8 | 13. | 12.2 | 11.5 |
| 67 | 18.4 | 17.1 | 15.9 | 14.8 | 14. | 13.1 | 12.3 | 11.7 |
| 68 | 18.8 | 17.3 | 16. | 15. | 14.2 | 13.2 | 12.4 | 11.9 |

To use the chart read down the first column headed "Pd. in mm.", which refers to the interpupillary distance in millimeters, until the determined interpupillary distance of the patient is reached. Then read horizontally from left to right across the top of the chart marked "Distance in cm.", until the distance of maximum convergence in centimeters just determined is reached. At the intersection of the chosen horizontal row with the chosen vertical column is the figure representing the maximum convergence of the patient expressed in meter angle.

For example, if the interpupillary distance is 60 millimeters, and the centimeter reading on the scale 39 representing the point of maximum convergence in centimeters is 6.0 centimeters, by referring to the chart and reading down the left hand column under "Pd. in mm.", until 60 is reached, then horizontally to the right along this row until the column headed 6.0 (distance in centimeters) is reached, the figure 14.5 is found to be in the square where this row and column intersect. Consequently, 14.5 meter angles of convergence is the maximum convergence in this instance.

To determine the amount of convergence in use or required at any near work distance, it is only necessary to compare the figure in centimeters representing this distance from the eyes and the determined interpupillary distance with the chart in the manner described.

*Reserve convergence*

With the maximum convergence expressed in meter angles determined in the manner set forth and the amount of convergence in use at the patient's usual work distance known, the amount of reserve convergence is evident, being the difference between the two readings. If the amount of convergence in use approaches too closely the maximum convergence possible there will be necessarily a low reserve and consequent symptoms of discomfort or limited ability to perform close work.

Through these tests, the presence of convergent insufficiency or excess is evidenced and consequently, an indication is gained as to the proper correction to be made to provide proper reserve and insure comfort at a given work distance.

*Comparison of accommodative and convergent functions*

The accommodative and convergent functions having been determined, a comparison of the accommodative function expressed in diopters and the convergent function expressed in meter angles can be made quickly and accurately, offering:

1. A comparison of maximum accommodation and convergence
2. A comparison of accommodation and convergence at any near point or usual near work distance; and
3. A comparison of reserve accommodation and convergence, maximally, at the usual work distance or at any specified point, which assists in defining accommodative and convergent insufficiency or excess.

*Binocular accommodation*

With this instrument the determination of binocular accommodation is a simple matter and requires merely turning the card 49 around so that its side bearing the test type faces the patient. The card is then moved toward the eyes as in the determination of maximum convergence to the point where the finest print can no longer be read. The reading thus obtained is of importance and assists materially in determining the proper lens to be prescribed as it affords an indication of the degree to which the muscles of convergence lend aid to the muscles of accommodation and vice versa.

From the foregoing description taken in connection with the accompanying drawings, it will be readily apparent to those skilled in the art to which this invention appertains, that this invention provides an improved method and apparatus for examining eyes and particularly for testing the functions of accommodation and convergence.

It will also be apparent that in the determination of these functions while one is being measured, the other is kept constant at a known value. In other words, all other conditions are maintained at a constant while one single function is being determined.

It will also be apparent that by eliminating the heretofore necessary substitution of lenses of progressively greater strength in the determination of accommodation and measuring the accommodation in one continuous uninterrupted process, the maximum latent power of the eye is brought out which heretofore was impossible.

It will further be apparent that by providing a single instrument for the measurement of all of these functions, the required tests can be made quickly and accurately.

What I claim as my invention is:

1. In a method of testing eyes, the steps of determining relative accommodation which comprises locating a card having test indicia in the direct line of vision of the eye being tested at a predetermined near work distance from the eye, interposing a spherical lens of known strength and sufficient to blur the indicia on the card between the eye and the card and near the eye, moving the lens along the line of vision to the point where the indicia just become legible, measuring in diopters the distance said point is located from the eye, and substracting the reading thus obtained from the known strength of the lens.

2. In a method of testing eyes, the step of determining the amount of accommodative relaxation possible at a predetermined near work distance from the eye, which comprises locating a card with test indicia thereon in the direct line of vision of the eye being tested and at said distance, interposing between the eye and the card and near the eye a known plus lens of sufficient power to blur the indicia, moving the lens smoothly along the line of vision toward the card until a point is reached where the indicia just become legible, measuring in diopters the distance of said point from the eye, and subtracting the dioptric strength of the lens used from said dioptric measurement, the resultant figure being an expression in diopters of accommodative relaxation possible at said predetermined near work distance.

3. In a method of testing eyes, the step of determining the amount of accommodative exertion possible at a predetermined near work distance from the eye, which comprises locating a card having test indicia in the direct line of vision of the eye being tested and at said predetermined distance, interposing between the eye and the card and near the eye a known minus lens of sufficient power to blur the indicia on the card, moving the lens smoothly toward the card to the point where the indicia just become legible, measuring in diopters the distance of said point from the eye, and subtracting the dioptric lens strength of the minus lens used from said dioptric measurement, the resultant figure being an expression in diopters of the greatest amount of accommodative exertion possible at said predetermined near work distance.

4. In the testing of eyes, the method of determining the amplitude of accommodation at a predetermined near work distance from the eye which comprises locating test indicia in the direct line of vision of the eye being tested at said distance, interposing between the eye and said test indicia and near the eye a known minus lens of sufficient power to blur the indicia, moving the lens smoothly toward the test indicia to the point at which the indicia just become legible, measuring in diopters the distance of said point from the eye, subtracting the dioptric lens strength of the minus lens used from said dioptric measurement, the resultant figure being an expression in diopters of the greatest amount of accommodative exertion possible at said predetermined near work distance, replacing said known minus lens with a known plus lens of sufficient power to blur the indicia, moving this lens smoothly along the line of vision toward the test indicia until a point is reached where the indicia just become legible, measuring in diopters the distance of said point from the eye, subtracting the dioptric strength of the plus lens used from said dioptric measurement, the resultant figure being an expression in diopters of the greatest amount of accommodative relaxation possible at said predetermined near work distance, and the difference between the resultant figures, which represent the extremes of accommodative exertion and relaxation, being the amplitude of accommodation expressed in diopters.

5. An instrument for use in testing eyes to determine convergent and accommodative functions, comprising spaced parallel rails, means mounting the rails for adjustment toward and from each other to enable their disposition at a spacing corresponding to any interpupillary distance, means movable along said rails for carrying test indicia for testing accommodative functions of each eye separately, a scale extending along said rails delineated in units of linear measurement and also in diopters whereby the location of said test indicia from one end of the rails may be readily determined either in expressions of linear measurement or diopters, and means for mounting a test object for linear movement between and parallel to said supports for determining the location of the near point of convergence and also binocular accommodation.

6. An instrument for testing eyes, comprising two spaced parallel members, means mounting the members to allow adjustment thereof toward and from each other to enable the same to be spaced at any interpupillary distance, means associated with said members for locating one end thereof in predetermined relationship to the eyes of a patient, separate means slidable along each of said members and each adapted to carry a test object along the direct line of normal vision of one eye for the measurement of monocular accommodative functions, means movable between said members in parallelism therewith for carrying other test indicia toward and from the eyes along a line medially of the lines of normal vision of the two eyes for the measurement of convergence and binocular accommodation, and a scale extending along said members and delineated in units of linear measurement and also in diopters so that the location of said test objects with respect to the eyes may be readily determined and expressed in either units of linear measurement or diopters.

7. An instrument of the character described, comprising a beam, two spaced rails extending along opposite sides of the beam, means adjustably mounting said rails from the beam to enable adjustment of said rails longitudinally, transversely and perpendicularly with respect to the beam, scales carried by said rails, and means for moving test cards and lenses smoothly along said rails.

8. In an instrument of the character described, a beam, a chin rest adjustably carried by the beam, a nose piece adjustably carried by the beam, said chin rest and nose piece being adjustable to fit a patient and to dispose the beam in predetermined relationship with respect to the patient, two spaced parallel rails disposed at opposite sides of the beam, means adjustably mounting the rails from the beam to enable longitudinal adjustment thereof with respect to the beam for the purpose of locating the same in predetermined definite positions with respect to the anterior surface of the cornea and for adjusting said rails vertically and transversely to permit their disposition in conformance to the interpupillary distance and location of the eyes and to insure parallelism of the rails, and means for sliding a test card and lenses smoothly along said rails.

9. In an instrument of the character described, two spaced rails, scales carried by said rails, a support, means carried by the support to fix the support in a predetermined position with respect to the patient's eyes, means for adjustably mounting the rails from the support so that the rails may be adjusted longitudinally, transversely and vertically into predetermined positions with respect to the patient's eyes and into parallelism, and means for sliding test cards and lenses smoothly and uniformly along said rails.

10. In an instrument of the character described, a straight beam, means carried by the beam engageable with parts of a patient's face so as to locate the beam in fixed relationship to the eyes of the patient, means on the beam for moving a test card along a straight path medially of the normal lines of vision of the two eyes for testing convergence and binocular accommodation, two separate parallel rails extending alongside the beam, adjustable means for mounting said rails from the beam whereby said rails may be adjusted to different interpupillary distances and locations of the eyes and into exact parallelism, and means for sliding test cards and lenses along said rails for measuring monocular accommodative functions.

11. In an instrument of the character described, a beam, a support for the beam, means carried by the beam engageable with parts of a patient's face to so hold the same with respect to the beam that the beam extends parallel to and medially of the directly forward lines of vision of the patient's eyes, means slidable along said beam for measuring convergent functions, rails extending along opposite sides of the beam, means slidable along said rails for measuring accommodative functions, and means adjustably mounting the rails from the beam so as to enable their parallel disposition in conformance with directly forward lines of vision of the patient's eyes.

12. In an instrument of the character described, a hollow beam, an adjustable support for the hollow beam, means engageable with parts of a patient's face to so hold the same with respect to the beam that the beam extends parallel to and medially of the directly forward lines of vision of the patient's eyes, a card carrier slidable along the beam and adapted to hold a test card for measuring convergent functions and binocular accommodation, means disposed within the beam and operable from the exterior thereof for adjusting the position of the card carrier on the beam, spaced rails extending along opposite sides of the beam, means adjustably mounting the rails from the beam so as to enable their disposition in conformance to the directly forward lines of vision at the patient's eyes, means slidable along said rails for carrying test cards and lenses for use in measuring monocular accommodative functions, and scales on the rails for directly indicating the position of said slidable means on the rails with respect to the patient's eyes.

13. A device for adjusting an eye testing instrument which instrument includes two spaced rails adapted to carry test indicia and lenses along the lines of vision of the patient's eyes and which spaced rails are adjustable to enable their disposition in conformance with the direct lines of vision of the patient's eyes, said device comprising a member having a base adapted to rest longitudinally on each rail separately, and transversely across both rails, scales carried by said member for measuring interpupillary distance and for spacing the rails in accordance with the patient's interpupillary distance, and level indicating means carried by said member and fixed with respect to the base so that by resting the device longitudinally on each rail the rails may be individually leveled so that together with the transverse spacing of the rails in accordance with the interpupillary distance of the patient's eyes adjustment of the rails into exactly parallel relationship is facilitated in the event the location of the patient's eyes require one rail to be on a higher plane than the other.

14. A device for use in adjusting an eye testing instrument which instrument includes a center beam adapted to be located in line with the center of a patient's nose and parallel to the directly forward lines of vision of the patient's eyes, and spaced rails on opposite sides of the beam adjustably mounted therefrom for carrying test indicia and lenses along said lines of vision of the patient's eyes, said device comprising a member having a base adapted to rest longitudinally on each rail separately, and transversely across both rails, scales carried by said member for measuring the distance from the center of the nose to the center of each eye and for spacing the rails in accordance with such determined measurements, and means on said member engageable with the beam to hold the device against shifting transversely with respect to the beam during the measurement of said distances from the center of the nose to the center of each eye and the spacing of the rails in accordance therewith so that the rails may be adjusted into parallelism with the beam.

HILMAR G. MARTIN.